United States Patent [19]

Storch

[11] Patent Number: 4,664,612
[45] Date of Patent: May 12, 1987

[54] APPARATUS FOR PRODUCING SEAT COVER CUSHIONS

[75] Inventor: Helmut Storch, Amberg, Fed. Rep. of Germany

[73] Assignee: Grammer Sitzsysteme GmbH, Amberg, Fed. Rep. of Germany

[21] Appl. No.: 826,555

[22] Filed: Feb. 6, 1986

[30] Foreign Application Priority Data

Feb. 22, 1985 [DE] Fed. Rep. of Germany ....... 3506244

[51] Int. Cl.[4] .................. B29C 45/18; B29C 45/46
[52] U.S. Cl. ..................................... 425/120; 425/543; 425/562; 425/572; 425/594
[58] Field of Search ................. 264/328.6; 425/4 R, 425/120, 256, 447, 543, 562, 572, 573, 589, 594, 817 R, 817 C, DIG. 247

[56] References Cited

U.S. PATENT DOCUMENTS

| | | | |
|---|---|---|---|
| 3,265,784 | 8/1966 | Jacolas | 425/817 R X |
| 3,718,417 | 2/1973 | Bethe | 425/4 R X |
| 3,873,656 | 3/1975 | Garner | 425/817 R X |
| 3,945,784 | 3/1976 | Collins | 425/817 R X |
| 4,029,454 | 6/1977 | Monnet | 425/573 X |
| 4,141,470 | 2/1979 | Schulte et al. | 425/543 X |
| 4,313,909 | 2/1982 | Boden et al. | 425/543 X |
| 4,315,724 | 2/1982 | Taoka et al. | 425/573 X |

FOREIGN PATENT DOCUMENTS

| | | |
|---|---|---|
| C68820 | 1/1983 | European Pat. Off. . |
| B2365740 | 8/1976 | Fed. Rep. of Germany . |

Primary Examiner—Robert Spitzer

[57] ABSTRACT

An apparatus for producing seat or backrest cushions from plastic foam in which the hardness of the cushion varies in different regions of the cushion. The components for making the different plastic foam mixture are first mixed in a mixing head, and then, depending on the desired hardness of the respective parts of the cushion, the respective mixture is then passed from the mixing head into a mold corresponding to the configuration of the cushion to be produced. The apparatus comprises a mixing head which is stationary in relation to the mold during operation of the process, and communicates with a distributor which opens into the mold and which deflects the respective foam mixture issuing from the mixing head into the designated regions of the mold.

4 Claims, 3 Drawing Figures

FIG.1
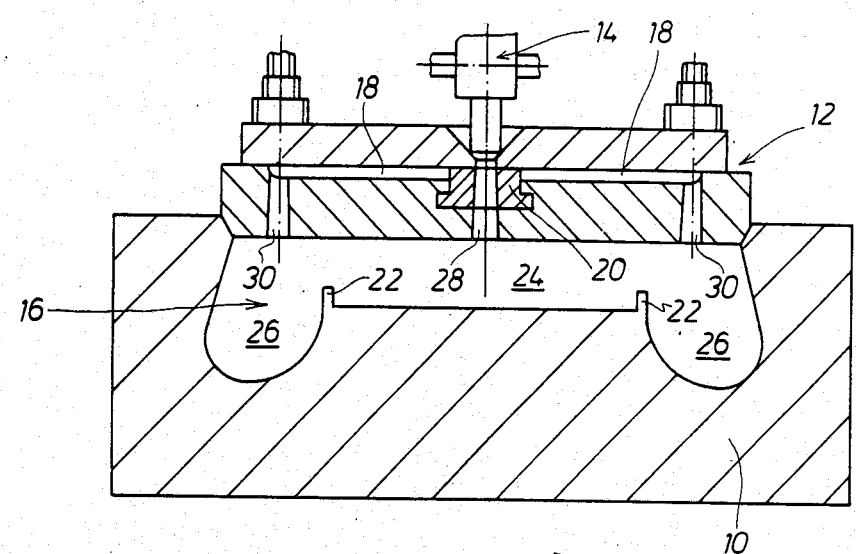
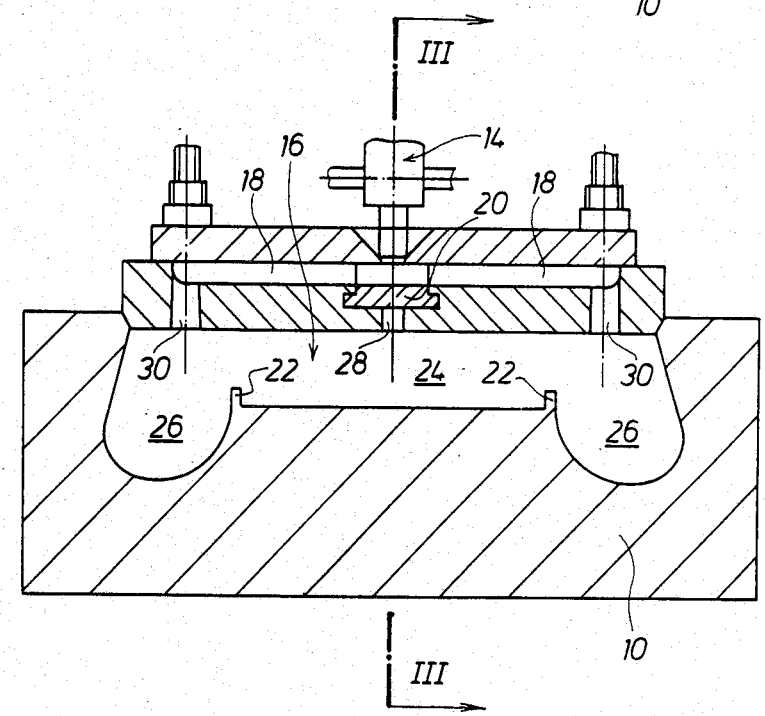
FIG.2

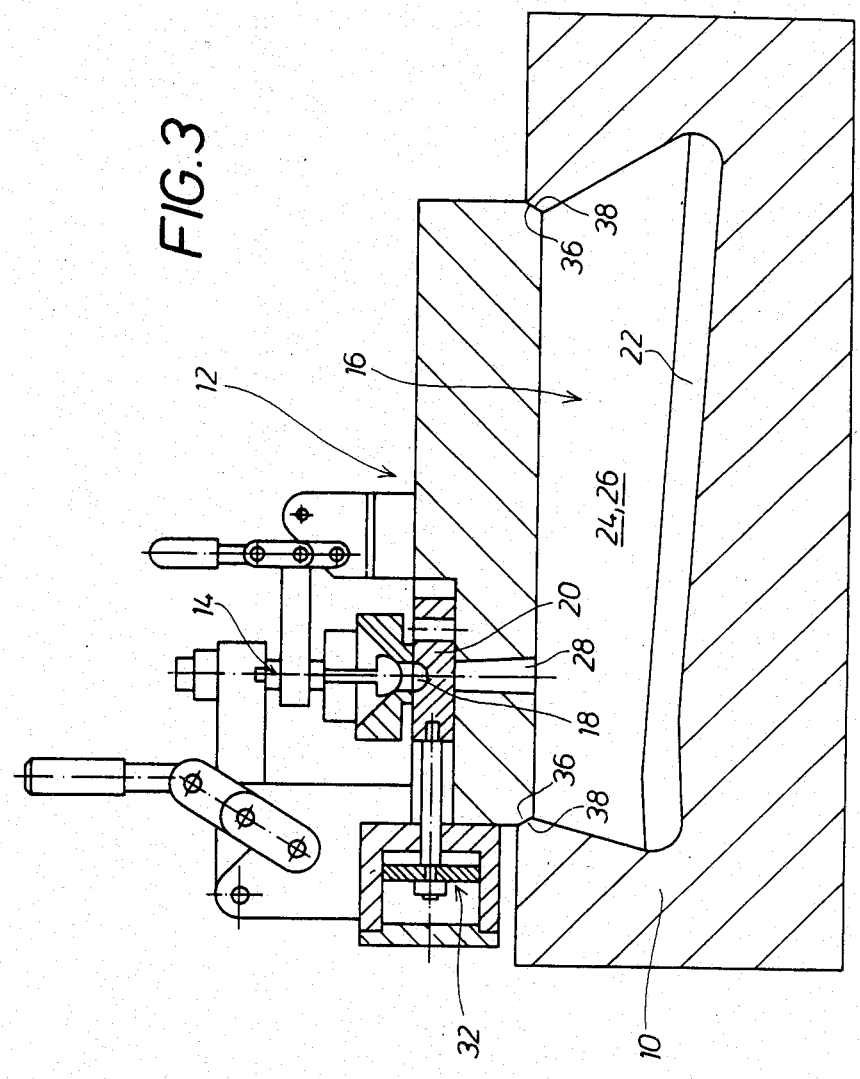

APPARATUS FOR PRODUCING SEAT COVER CUSHIONS

BACKGROUND OF THE INVENTION

The invention relates to a process for the production of cushions of plastic foam for seats. The cushions may be used to form either a seat portion on a backrest portion of a seat, but for convenience and conciseness in this specification the term seat cushion will be used broadly to designate those potential situations of use.

In order for seat cushions to enjoy a higher degree of stability and strength in their side regions, for example outer cheek portions, seat cushions may be produced from plastic foam in such a way that the side regions thereof are made using a plastic foam which has a higher level of compression hardness than the middle region of the seat cushion which is thus softer.

In a known process for producing seat cushions from plastic foam of that nature, that is to say, having a softer middle region and harder side regions to provide additional support at the sides of the seat cushion, two mixing heads are employed for forming the plastic foam mixture and injecting it into a mold. Thus, the components of the plastic foam which may be for example a polyurethane foam are mixed in the two mixing heads, and caused to foam in the mold which corresponds to the configuration of the seat cushion to be produced. That process provides that the two mixing heads are firstly positioned above the middle of the mold which is in an open condition. The above-mentioned components of the plastic foam are then mixed in the mixing heads in such a way that a plastic foam with a low degree of compression hardness can be caused to foam and be molded in the mold. After that plastic foam has been injected into the mold, the two mixing heads are moved away from each other in mutually opposite directions until the two mixing heads are positioned over the lateral regions of the open mold. With the two mixing heads in that position, the components making up the plastic foam are altered in such a way as to produce a plastic foam with a higher degree of compression hardness, which can thus be caused to foam up in the mold.

The above-indicated steps in that process, namely foaming a plastic foam with a low degree of compression hardness in the middle region of the open mold, moving the two mixing heads away from each other from the middle region of the mold to the laterally mutually oppositely disposed regions of the mold and then molding a plastic foam with a higher degree of compression hardness in the lateral regions of the mold, take place at very short intervals of time so that the plastic foams, with their different degrees of hardness, react simultaneously and the increase in volume of the two plastic foams also occurs at the same time.

It should be noted in connection with that process that ribs which are provided in the open mold between the middle region and the lateral regions thereof ensure that the plastic foams, with their differing degrees of compression hardness, do not mix with each other in a liquid condition directly after having been introduced into the open mold in order to foam up therein.

It will be clear from the foregoing discussion that that known process requires two mixing heads while in addition it is only possible for the plastic material to be introduced into a mold which is in an open condition, for the purposes of foaming therein, because the mixing heads move over the mold. However, the step of introducing plastic material into an open mold for the purposes of forming foam therein may give rise to problems in particular when using shallow molds to produce molded articles which are not of substantial depth, because of the possibility of the plastic foam overflowing out of the mold and thus fouling the outside of the mold and possibly the area around it.

Another process for the production of seat cushions from plastic foam requires only a single mixing head. In that process, the mixing head is moved continuously over the mold which is open, while at the same time as the mixing head moves, the compression hardness of the plastic foam for making up the seat cushion is adjusted and controlled, by altering the ratio between the components used for making up the plastic foam, in accordance with the respective position of the mixing head in relation to the mold. However, continuously adjusting the ratio between the components in the mixture for making the plastic foam in dependence on the position of a continuously moving mixing head involves a complex and therefore very expensive construction. Likewise this process is also such that the plastic foam can only be introduced into and foamed in an open mold because the mixing head is still required to move over the mold in order to produce the different hardnesses of the middle and side regions of the seat cushion molded in the mold. For that reason also the process just discussed is very severely limited in regard to its suitability for producing moldings of shallow depth.

SUMMARY OF THE INVENTION

The object of the present invention is to provide an apparatus for the production of cushion members for plastic foam with varying degrees of compression hardness in different regions thereof, which uses a single mixing head in fixed relationship, during operation of the apparatus, with the mold for shaping the cushion member, whereby the mold may be of a configuration that is closed to permit greater variety in the depth of the mold and the foamed members produced therein.

In accordance with the principles of the present invention, these and other objects are achieved by a process for the production of seat cushions, for making seat or backrest portions, of plastic foam, wherein the cushions comprise regions with different degrees of compression hardness. The components for making up the plastic foam mixture are mixed in a mixing head, in dependence on the desired said hardness to be produced, and the mixture formed in the mixing head is introduced into a mold corresponding to the required configuration of the cushion, from the mixing head. The mixing head is stationary with respect to the mold, at least during operation of the process. The mixing head communicates with a distributor means which in turn communicates with the mold cavity of the mold in a selectively controllable fashion. In a first phase of the process in which the distributor means is selectively controlled to communicate only with a region of the mold cavity that corresponds to the region of the cushion having a first or lower level of compression hardness, plastic foam is initially introduced only into that first region of the mold, from the mixing head. In a second phase of the process, the ratio of the components making up the plastic foam mixture in the mixing head is altered to the second level of said hardness, such as the higher level of hardness, and the distributor means is selectively controlled in such a way that the mixture produced in the mixing head is then introduced by way of the distributor means only into at least one second region of the mold cavity, which corresponds to the one or more regions of the cushion which are to have the second or higher level of compression hardness.

It will be seen therefore that the process in accordance with the teachings of the present invention can be carried out using only a single mixing head provided with a distributor means that communicates with the mold cavity in the above-indicated fashion. Thus, when the plastic material for making up the first region of the molded cushion which has the lower level of compression hardness has been introduced into the appropriate portion of the mold cavity, the ratio between the components of the mixture for making up the plastic foam in the mixing head is adjusted in such a way as to produce a mixture that will give a plastic foam with the second and higher level of compression hardness, the distributor means then being operable such that the mixture for producing the harder plastic foam is introduced into the other regions of the mold cavity in which the molded seat cushion is to have a higher level of compression hardness. Once the further and harder regions of the seat cushion have been produced in the mold, the mixing head can be very easily restored to the ratio between the components for producing the plastic foam mixture that gives the lower level of compression hardness in the foamed seat cushion, and the distributor means can also be returned to its initial position in which it feeds the plastic foam mixture only into that region of the mold cavity that corresponds to the region of the seat cushion with the lower level of compression hardness. It will be clear therefore that the process involves simple adjustment at the mixing head, to vary the above-mentioned ratio between the components of the mixture, and an equally simple adjustment at the distributor means to provide for the selectively controllable feed of plastic material mixture into the appropriate regions of the mold cavity.

It should be appreciated furthermore that, as the mixing head involved in carrying out the process according to the present invention does not move in relation to the mold, the mold may be of a closed configuration, thereby making it possible in a particularly simple manner to produce not just deep but also shallow moldings from plastic foam as the fact that the mold is of a closed configuration means that there is no risk of plastic foam overflowing out of the mold, as was the case when using an open mold.

In accordance with a further aspect of the present invention, apparatus for the production of seat cushions of plastic foam wherein the cushions include regions with different levels of compression hardness comprises a mold and a mixing head for mixing components of the plastic material which is to be introduced into the mold for foaming therein to produce the molded foam cushion. The mixing head is stationary relative to the mold, in operation of the apparatus, and the apparatus further includes a distributor means which communicates with the mixing head for receiving the plastic foam mixture therefrom and also communicates with respective regions of the mold cavity of the mold, in which the various regions of the cushions with different degrees of compression hardness are to be produced. The distributor means also includes a direction-changing means therein to provide for selective control of the path of flow of the plastic foam mixture issuing from the mixing head, to guide the mixture towards the respective regions of the mold cavity. Thus in a first operating condition the distributor means causes the mixture issuing from the mixing head to flow into the region of the mold cavity in which the cushion region with the lower level of compression hardness is to be formed and in a second operating condition the distributor means causes the foam mixture to pass into the other regions of the mold cavity in which the compression hardness of the foam mixture molded therein is to be at a higher level.

In an advantageous feature of the invention, the apparatus includes a closure means for closing the mold cavity which in itself is open upwardly and the mixing head is disposed on the closure means. The closure means also carries the distributor means with the direction-chaning means for the flow of plastic material as it passes from the mixing head into the mold cavity. By virtue of that configuration, the plastic material may be foamed in the mold when the mold is in a closed condition. That ensures, in particular when dealing with molds of a shallow or a curved configuration, that the foam cannot flow out of the mold while still in a liquid condition.

Further objects, features and advantages of a process and apparatus in accordance with the teachings of the present invention for the production of plastic foam seat or backrest cushions will be apparent from the following description of a preferred embodiment of the invention, with reference to the accompanying drawings.

BRIEF DESCRIPTION OF THE DRAWINGS

FIG. 1 is a view in section through an apparatus according to the invention with the plastic material direction-changing means of the distributor means in a position in which the middle region of the mold receives plastic foam that is intended to provide a lower level of compression hardness for the molded seat cushion, FIG. 2 is a view in section corresponding to that shown in FIG. 1 through an apparatus in which the plastic material direction-changing means is in a position such that the plastic material which is intended to provide the regions of the molded cushion which have a higher level of compression hardness, on issuing from the mixing head, is diverted into regions of the mold which are disposed laterally beside the central region of the mold, and FIG. 3 is a view of the apparatus shown in FIG. 2 in section taken along line III—III in FIG. 2.

DESCRIPTION OF THE PREFERRED EMBODIMENT

Referring now to the drawings, shown therein in basic form is an apparatus for the production of cushions of plastic foam, for example for seat or backrest portions, wherein the cushions comprise regions with different levels of compression hardness, formed by using different mixtures of plastic material to produce the appropriate foam in the mold. More specifically, the apparatus has a lower or bottom mold portion 10 which defines a mold cavity as indicated at 16. The mold cavity is open upwardly, as can be clearly seen from for example FIG. 1. The apparatus further comprises a closure means 12 which fits to the lower mold portion 10 and thereby closes off the opening of the upwardly open mold cavity 16, thereby defining a closed mold cavity for receiving the plastic material for producing the foam cushion. The apparatus further comprises a mixing head which is indicated generally at 14 and which is carried on the closure means 12.

The closure means 12 includes a distributor means which is indicated generally at 18 and which is of such a configuration as to provide a communication between the outlet of the mixing head 14, and the mold cavity 16, in a manner that will be described hereinafter. The closure means 12 further includes a deflector or direction-changing means 20 which is operable selectively to divert the flow of plastic material issuing from the mixing head, in a manner that will also be described hereinafter.

Provided in the mold cavity 16 are ribs as indicated at 22 which are positioned in the transitional regions between a middle portion 24 of the mold cavity 16 and two lateral portions 26 of the mold cavity 16. When therefore plastic materials of different constituencies which are intended to form respective regions in the molded cushion that have different levels of compression hardness, as are molded in the respective regions 24 and 26 of the mold cavity 16, are injected into the mold cavity, the ribs 22 ensure that the different plastic materials cannot mix with each other in the mold cavity 16, while in the fluid condition therein.

Looking now more specifically at the distributor means 18, as mentioned above the distributor means 18 communicates with the outlet opening or nozzle of the mixing head 14, and further has outlets as indicated at 28 and 30. The outlet 28 is disposed in such a position as to open at the central region 24 of the mold cavity 16 while the outlets 30, of which there are a plurality, are so positioned as to open into the two lateral regions 26 of the mold cavity 16.

Plastic material issuing from the mixing head 14 could thus flow through the distributor means to the outlets 28 or 30, with the actual flow path of the plastic material being controlled by the direction-changing means 20 to which reference will therefore now be made.

Thus, the direction-changing means 20 is in the form of a slide member disposed between the mixing head and the main body portion of the distributor means 18. As indicated above, the means 20 is provided for selective control of the flow path of the plastic material issuing from the mixing head and thus serves to pass the plastic material either into the region 24 in which the foam material is to have a lower level of compression hardness, or into the regions 26 in which the foam material is to provide a higher level of compression hardness.

In FIG. 1, the direction-changing means 20 is in such a position that the plastic material is introduced into the middle region 24 of the mold cavity 16 through the outlet opening 28. It can be seen from FIG. 1 that the slider or direction-changing means 20 thus provides a direct communication from the mixing head 14 into the middle region 24 of the mold cavity.

In FIGS. 2 and 3 on the other hand the direction-changing means 20 is in a second operating position in which the outlet opening 28 is closed off and the mixing head communicates with the two lateral outlet openings 30 and thus with the lateral regions 26 of the mold cavity 16, by way of the alternative flow path configuration in the distributor means 18, whereby plastic material which is such as to produce plastic foam with a higher level of hardness can pass from the mixing head 14 by way of the distributor means 18 and through the outlet openings 30 into the lateral regions 26 of the mold cavity.

It will be seen therefore that the mixing head 14, in operation of the apparatus, remains stationary with respect to the mold, and the differing feed flow of different plastic material into the respective regions of the mold is provided by the distributor means 18 and suitable operation of the direction-changing means 20. It will be appreciated that, at the same time as the flow path configuration of the plastic material between the mixing head 14 and the mold cavity 16 is changed in the two operating phases of the apparatus, the nature of the plastic material issuing from the mixing head 14 is likewise varied to provide the differing levels of compression hardness for the seat cushion which is molded in the mold cavity 16 and more specifically the ratio between the components making up the plastic material mixture that is mixed in the mixing head 14 will be suitably varied.

Referring now more specifically to FIG. 3, reference numeral 32 therein denotes an actuating device for the direction-changing means 20, for example as illustrated in the form of a piston cylinder-like unit operatively connected to the slider forming the operative part of the direction-changing means 20, to displace it between its two operating positions as referred to above. Reference numerals 36 and 38 designate an inclined surface on the lower mold portion 10 and a co-operating inclined surface on the closure means 12, those two surfaces 36 and 38 thus combining to provide for positive location of the closure means 12 relative to the lower mold portion 10 in order satisfactorily to close off the mold cavity 16.

It will be appreciated that the apparatus according to the invention may also have a plurality of mixing heads 14 which in operation of the apparatus are fixed in relation to the mold. The plurality of mixing heads provides that plastic material can be introduced into the mold cavity to fill it more rapidly than a single stationary mixing head, thereby reducing the cycle times of the apparatus. It will be appreciated that the combination of the stationary mixing head or heads 14 and the distributor means 18 with its selective outlet openings 28 and 30 further provide for more rapid and more uniform distribution of the plastic material for foaming in the mold cavity 16, than when using movable mixing heads, while also being of a substantially simpler construction.

With the apparatus in accordance with the invention, as described hereinbefore, to carry out a process for producing a molded seat or backrest cushion of plastic foam with regions of different levels of compression hardness, the components of the plastic material for forming the plastic foam are mixed in the mixing head, in dependence on the required hardness of the portion of the cushion which is to be produced in the central region 24 of the mold cavity. The mixture is then passed from the mixing head 14 into the central region 24 of the mold cavity by way of the distributor means 18 and more specifically the communication formed thereby between the mixing head 14 and the outlet opening 28. The plastic material which is thus introduced only into the region 24 of the mold cavity provides the portion of the cushion having a lower level of compression hardness. Then, in a second phase, the components in the mixing head 14 are altered, for example by adjusting the ratio of mixing thereof, to provide a plastic foam which has a higher level of compression hardness. That plastic material after mixing in the mixing head 14 is then passed only into the regions 26 of the mold cavity 16, by the distributor means 18 providing the alternative, selectively controllable, flow path configuration which is adapted to that end.

Various modifications and alterations may be made in the abovedescribed process and apparatus in accordance with the teachings of the present invention without thereby departing from the spirit and scope of the invention.

I claim:

1. Apparatus for the production of molded seat cushions of plastic foam which have a central region with a first level of compression hardness and first and second lateral regions with a higher level of compression hardness at respective sides of said central region, comprising: mold means providing a mold cavity of a configuration corresponding to the configuration of the molded seat cushion; at least one mixing head adapted to mix components of plastic foam material to be introduced into the mold cavity; a plastic material flow distributor means operatively disposed between said at least one mixing head and said mold cavity and comprising an inlet opening communicating with said at least one mixing head and a plurality of outlet openings, at least a first one of said outlet openings communicating with a central region of said mold cavity which corresponds to said central region of said seat cushion and at least second and third ones of said outlet openings each communicating with respective lateral regions of said mold cavity which are disposed on respective sides of said central region of said mold cavity and which respectively correspond to said lateral regions of said seat cushion; and a plastic material flow control means in said distributor means and displaceable between a first position in which said at least one mixing head is in communication only with said at least one first outlet opening and a second position in which said at least one mixing head is in communication only with said at least second and third outlet openings, thereby to provide for the selectively controllable introduction of different plastic foam materials into said central region and said lateral regions of said mold cavity.

2. Apparatus as set forth in claim 1 and further including a closure means providing an upper mold portion and adapted to close said mold cavity, and actuator means carried by said closure means, for displacing said flow control means between said first and second positions.

3. An apparatus for the production of parts, especially of seat cushions of molded plastic foam, comprising
at least one mold having
mold cavities.
a single mixing head which in respect to said mold is located in a fixed position and which is provided for mixing components of plastic foam material placed into the mold; and
a distributor means operatively disposed between said mixing head and said mold comprising
a reversing means which is provided with flow paths, wherein each of sid mold cavities of the mold comprises
an inlet which is connectably arranged with one of the flow paths of the reversing means, characterized in that the flow paths of said reversing means are subdivided into two groups which are separated from each other, wherein at least one flow path of
a first group, which is provided for inputing the plastic foam with a higher level of compression hardness into
a first mold cavity, and at least one flow path of
a second group which is provided for inputing plastic foam with a lower level of compression hardness into
a second mold cavity, are subsequently connectable with said mixing head.

4. Apparatus as set forth in claim 3 wherein
said mold cavities are substantially open at the side thereof which is towards said mixing head and further including
a closure means adapted to close the opening of said mold cavities, said closure means carrying the mixing head thereon and further carrying the distributor means with
a direction-changing means thereof.

* * * * *